US010861038B2

(12) United States Patent
Kamireddy et al.

(10) Patent No.: US 10,861,038 B2
(45) Date of Patent: Dec. 8, 2020

(54) METHODS AND SYSTEMS FOR EFFICIENT PROMOTIONAL PRICE ADJUSTMENT

(71) Applicant: Home Depot Product Authority, LLC, Atlanta, GA (US)

(72) Inventors: Nagaraja R. Kamireddy, Southlake, TX (US); Mohamed M. Nazeemudeen, Cumming, GA (US); Dhinakaran Soundarapandian, Marietta, GA (US); Dahesh Patel, Marietta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 848 days.

(21) Appl. No.: 15/499,655

(22) Filed: Apr. 27, 2017

(65) Prior Publication Data

US 2018/0315069 A1 Nov. 1, 2018

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0222* (2013.01); *G06Q 30/0239* (2013.01); *G06Q 30/0603* (2013.01); *G06Q 30/0633* (2013.01)

(58) Field of Classification Search
CPC .......... G06Q 30/0222; G06Q 30/0603; G06Q 30/0633; G06Q 30/0207; G06Q 30/0239
USPC .............................................. 705/14.1, 14.23
See application file for complete search history.

(56) References Cited

U.S. PATENT DOCUMENTS

| 8,025,224 B2 | 9/2011 | Fajkowski |
| 8,150,736 B2 * | 4/2012 | Horn .................... G06Q 10/087 705/26.1 |
| 8,271,320 B2 | 9/2012 | Agrawal et al. |
| 8,271,324 B2 | 9/2012 | Greenfield et al. |
| 8,977,561 B2 | 3/2015 | Vodopia |
| 9,466,069 B2 * | 10/2016 | Paulson ............. G06Q 30/0211 |
| 2003/0074278 A1 | 4/2003 | Keohane et al. |

(Continued)

FOREIGN PATENT DOCUMENTS

WO 2016/142830 A1 9/2016

OTHER PUBLICATIONS

ISR and WO issued re international application No. PCT/US2018/27742, dated Jul. 6, 2018, 9 pgs.

(Continued)

*Primary Examiner* — Luis A Brown
(74) *Attorney, Agent, or Firm* — Greenberg Traurig, LLP

(57) ABSTRACT

A promotion price adjustment system of the present application utilizes improved data definitions, caching, and a combination of online and offline processing to increase the efficiency and speed of applying promotional discounts in electronic retail systems. The system performs an offline batch process on a product catalog to generate a predetermined mapping between products in the catalog and candidate promotions. When checkout of a product in a virtual shopping cart is initiated, the product's candidate promotions are obtained from the predetermined mapping. Each of those candidate promotions is then evaluated against the properties of the virtual shopping cart to determine which of those candidate promotions are eligible for application. Any eligible promotions may serve as a basis for applying price discounts to the virtual shopping cart.

18 Claims, 11 Drawing Sheets

(56) References Cited

U.S. PATENT DOCUMENTS

| | | |
|---|---|---|
| 2005/0075927 A1 | 4/2005 | Nash |
| 2005/0096959 A1* | 5/2005 | Kumar ............... G06Q 10/0633 705/7.26 |
| 2007/0055568 A1* | 3/2007 | Osborne ............ G06Q 30/0225 705/14.26 |
| 2007/0174223 A1* | 7/2007 | Holmes ................. G06N 5/025 706/47 |
| 2009/0106115 A1 | 4/2009 | James et al. |
| 2009/0234722 A1* | 9/2009 | Evevsky ................ G06Q 30/02 705/14.1 |
| 2009/0265445 A1* | 10/2009 | Lewis ............... G06Q 30/0225 709/218 |
| 2011/0153400 A1* | 6/2011 | Averbuch ............. G06Q 30/02 705/14.25 |
| 2012/0197705 A1* | 8/2012 | Mesaros ............ G06Q 30/0641 705/14.23 |
| 2012/0203585 A1* | 8/2012 | Junker .................. G06Q 10/06 705/7.11 |
| 2013/0080235 A1* | 3/2013 | Wolfe ................ G06Q 30/0222 705/14.26 |
| 2013/0179250 A1 | 7/2013 | Nguyen et al. |
| 2013/0311332 A1* | 11/2013 | Favish ............... G06Q 30/0269 705/26.41 |
| 2013/0325575 A1* | 12/2013 | Byrd ..................... G06Q 30/02 705/14.23 |
| 2014/0019298 A1* | 1/2014 | Suchet ............... G06Q 30/0633 705/26.8 |
| 2014/0067581 A1* | 3/2014 | Yamahara .......... G06Q 30/0601 705/26.1 |
| 2015/0302456 A1* | 10/2015 | Rego .................. G06Q 30/0235 705/14.35 |
| 2016/0267572 A1* | 9/2016 | Zimmerman .......... G06Q 30/06 |
| 2016/0283925 A1* | 9/2016 | Lavu .................... G06Q 20/401 |
| 2016/0283954 A1* | 9/2016 | Lei ..................... G06Q 30/0202 |
| 2017/0091833 A1* | 3/2017 | Berger .................... H04L 67/02 |
| 2017/0161767 A1* | 6/2017 | Mead ................. G06Q 30/0222 |
| 2017/0236152 A1* | 8/2017 | Dimaunahan ...... G06Q 30/0253 705/14.51 |
| 2017/0301005 A1* | 10/2017 | Reddy .................... G06Q 20/12 |
| 2017/0323295 A1* | 11/2017 | Kranzley ........... G06Q 30/0611 |
| 2018/0232768 A1* | 8/2018 | Barak ................ G06Q 30/0235 |
| 2018/0232769 A1* | 8/2018 | Barak ................ G06Q 30/0235 |

OTHER PUBLICATIONS

"Coupons.com Launches Digital Clearing & Settlement Service Providing First End-to-End Promotions Platform for Manufacturers and Retailers", https://www.quotient.com/coupons-com-launches-digital-clearing-settlement-service-providing-first-end-to-end-promotions-platform-for-manufacturers-and-retailers/, accessed Feb. 2, 2017

* cited by examiner

1100

*Category / Subcategory / Product*

*SKU # 1234567890*

Company
Widget
★★★☆ ✓ Write a Review   Questions & Answers
- Feature A
- Feature B
- Feature C

$49.99 /each (limit 6 per order)

SPECIAL SALE!

*Buy more and save!* — 1101

| Promotion Details   *Price valid: Start date – End date* ← 1102
Buy 3 Widgets and receive $20 off your order.
*Limit 6 per customer*

1103 ↗
1104 ↗

●○○○

Product description
___

*FIG. 11*

METHODS AND SYSTEMS FOR EFFICIENT PROMOTIONAL PRICE ADJUSTMENT

FIELD OF THE DISCLOSURE

The present description relates generally to price adjustment systems and methods for improving the performance thereof.

BACKGROUND

The proliferation of internet-connected computers and smartphones has led to the rise of online shopping. Consumers are now able to purchase a wide variety of products from online retailers. As more companies begin to provide the option to shop online, competition has increased. Savvy consumers can easily and quickly compare prices of products between online retailers. It has therefore become increasingly important for companies to offer promotional discounts to attract consumers.

A retailer may have thousands—or even millions—of products in its catalog. That retailer can have hundreds of active promotions that may or may not be applicable to a user's virtual shopping cart or items therein. Additionally, thousands of visitors may be shopping on that retailer's website simultaneously. Given these circumstances, a considerable amount of computing resources is typically required to determine valid and eligible discounts, leading to significant costs in either computing infrastructure or payments to platform-as-a-service (PaaS) vendors.

In addition to the increased costs, inefficiencies in an online shopping implementation can lead to a slow user experience. Real time application of price discounts can involve many computing steps, during which the user must wait for those computations to complete. Furthermore, retrieval of information from an online retailer's servers can take a considerable amount of time, depending on the quality of the network connection between those servers and the user's device. Collectively, these inefficiencies can lead to significant wait times, during which the user may become frustrated and leave the retailer's website. In today's highly competitive online shopping environment, even small amounts of wait time can lead to a substantial loss of potential sales.

It is accordingly an objective of the present invention to provide systems and methods that improve the efficiency of computational and networking processes used to implement online shopping platforms. It is a further objective of the present invention to improve the determination and application of promotions to a user's virtual shopping cart.

SUMMARY

According to one aspect of the present invention, there is provided, in a server, a method for applying promotional price adjustments to a virtual shopping cart. The method involves obtaining, from a storage device, product data representative of a plurality of products. Each product includes product metadata defining one or more properties of that product. The method also involves obtaining, from the storage device, promotion data representative of a plurality of promotions. Each promotion includes promotion metadata defining one or more purchase conditions. The method further involves generating, by the server, a mapping between the plurality of products and the plurality of promotions. The mapping associates at least a first product with a first candidate promotion. The first candidate promotion includes an item-specific purchase condition and a cart-specific purchase condition. A given promotion is a candidate promotion for a given product if at least one of the purchase conditions of the given promotion is an item-specific purchase condition that is satisfied by at least one of the one or more properties of the product metadata of the given product. The method also involves receiving, from a client device, cart data representative of the virtual shopping cart. The cart data includes first product data representing the first product and cart metadata defining one or more properties of the virtual shopping cart. Additionally, the method involves determining, by the server, that the first candidate promotion is a first eligible promotion based on the cart-specific purchase condition being satisfied by at least one of the one or more properties of the virtual shopping cart. Further, the method involves determining, by the server, a first discounted price for the first product based on the product metadata of the first product and the first eligible promotion. The operations also include transmitting the first discounted price to the client device for application to the virtual shopping cart.

According to another aspect of the present invention, there is provided, in a server, a method for applying promotional price adjustments to a virtual shopping cart. The method involves obtaining, from a storage device, product data representative of a plurality of products. Each product includes product metadata defining one or more properties of that product. The method also involves obtaining, from the storage device, promotion data representative of a plurality of promotions. Each promotion includes promotion metadata defining one or more purchase conditions. The method also involves generating, by the server, a mapping between the plurality of products and the plurality of promotions. The mapping associates at least a first product with one or more candidate promotions. The first candidate promotion includes an item-specific purchase condition and a cart-specific purchase condition. A given promotion is a candidate promotion for a given product if at least one of the purchase conditions of the given promotion is an item-specific purchase condition that is satisfied by at least one of the one or more properties of the product metadata of the given product. The method further involves receiving, from a client device, cart data representative of the virtual shopping cart. The cart data includes first product data representing the first product and cart metadata defining one or more properties of the virtual shopping cart. Additionally, the method involves determining, for each of the one or more candidate promotions associated with the first product, whether that candidate promotion is an eligible promotion for application to the virtual shopping cart based on at least one cart-specific purchase condition associated with that candidate promotion being satisfied by at least one of the one or more properties of the virtual shopping cart. Further, the method involves determining a discounted price for the first product based on the product metadata of the first product and the at least one eligible promotion upon determining that at least one of the one or more candidate promotions is an eligible promotion. The method also involves transmitting the discounted price to the client device for application to the virtual shopping cart.

According to yet another aspect of the present invention, there is provided a system for applying promotional price adjustments to a virtual shopping cart comprising a first server and a second server. The first server is configured to maintain a catalog database that includes a plurality of products and a plurality of promotions. Each product includes product metadata defining one or more properties of that product. Each promotion includes promotion metadata defining one or more purchase conditions. The second server is configured to provide an online shopping website over a wide area network. The second server is communicatively coupled to the first server via the wide area network. The first server is also configured to generate a mapping between the plurality of products and the plurality of promotions. The mapping associates at least a first product with a first candidate promotion based on at least one of the one or more properties of the first product satisfying an item-specific purchase condition of the first candidate promotion. The first server is further configured to transmit, via the wide area network, the mapping to the second server. The second server is configured to store, on a storage device of the second server, the generated mapping received from the first server. The second server is also configured to receive, from a client device over the wide area network, a checkout request associated with a virtual shopping cart. The second server is further configured to obtain cart data representative of the virtual shopping cart, wherein the cart data includes first product data representing the first product and cart metadata defining one or more properties of the virtual shopping cart. Additionally, the second server is configured to determine, based on the stored mapping, that the first candidate promotion is a first eligible promotion based on the cart-specific purchase condition being satisfied by at least one of the one or more properties of the virtual shopping cart. Further, the second server is configured to determine a first discounted price for the first product based on the product metadata of the first product and the first eligible promotion. The second server is also configured to transmit the first discounted price to the client device for displaying the first eligible promotion being applied to the virtual shopping cart.

The foregoing summary is illustrative only and is not intended to be in any way limiting. In addition to the illustrative aspects, embodiments, and features described above, further aspects embodiments, and features will become apparent by reference to the figures and the following detailed description and the accompanying drawings.

BRIEF DESCRIPTION OF THE DRAWINGS

FIG. 11 is an illustration of promotional messaging, according to an example embodiment.

DETAILED DESCRIPTION

Figure 1:
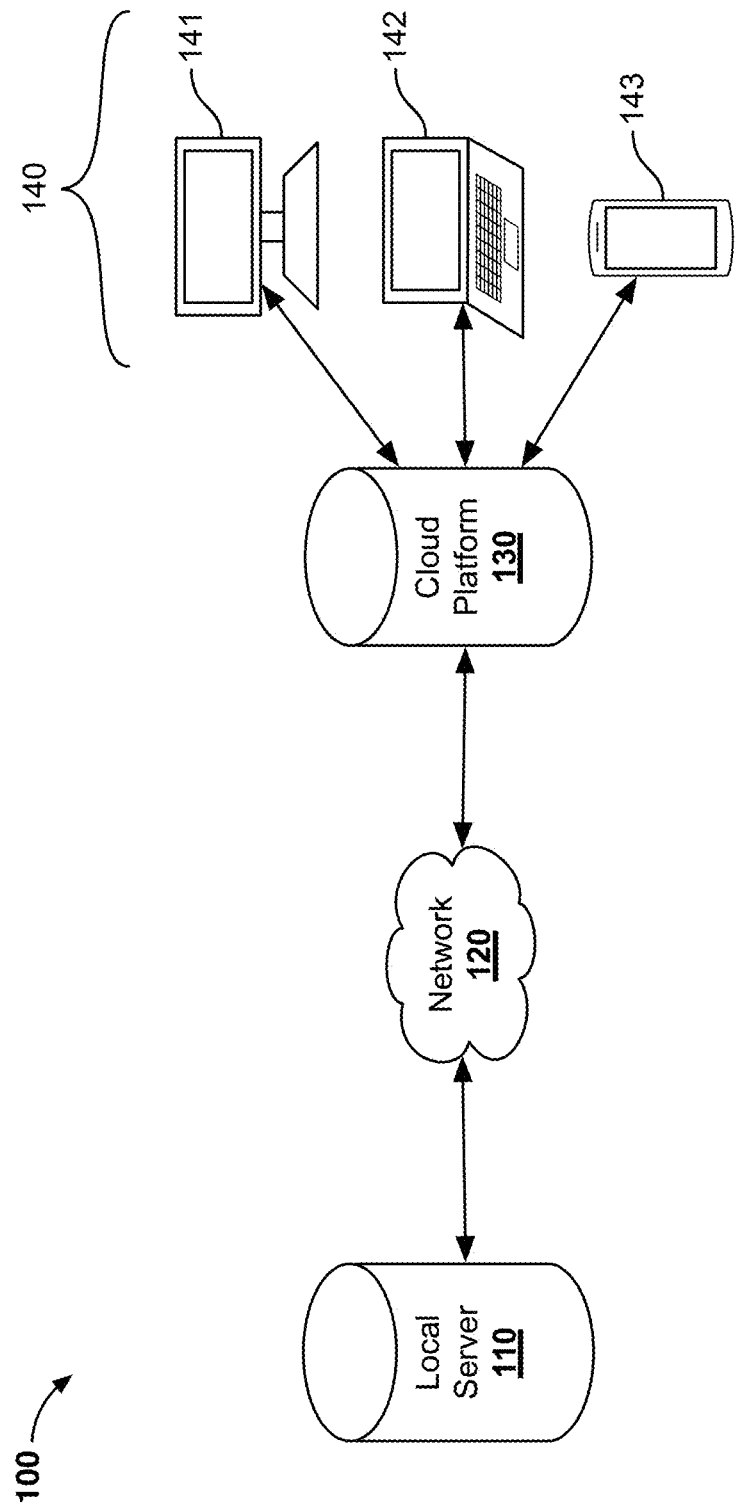
FIG. 1 is a schematic diagram of a promotion system, according to an example embodiment.

The following description of example methods and apparatus is not intended to limit the scope of the description to the precise form or forms detailed herein. Instead the following description is intended to be illustrative so that others may follow its teachings.

I. Overview

A retailer may wish to offer promotions—such as price adjustments, bundle discounts, coupons for spending over a threshold amount of money, etc.—as a way to increase the sales of its products. Some promotions are item-specific (e.g., item x is on clearance at 60% off), brand-specific (e.g., all items of brand x are 10% off), or category-specific (e.g., 5% of all refrigerators). Other promotions may be non-item-specific or cart-specific, such as coupons (e.g., 15% entire cart when coupon is applied) or spending threshold discounts (e.g., $10 off if cart is over $100). Promotions may also provide price reductions when two or more items are purchased in a single transaction.

Integrating these various types of promotions into a computer system or computing platform can be challenging. For instance, a user's virtual shopping cart in an online shopping website may contain multiple items, some of which may be eligible for promotional discounts. Furthermore, an entire virtual cart may also be eligible for a promotional discount. A system that determines applicable promotions to a user's cart may be slow, depending on the number of items in the cart that are evaluated against a set of available promotions. If the system is slow, a user may become frustrated and choose to leave the website without purchasing the items to the detriment of the retailer.

The present disclosure generally relates to a high performance electronic shopping platform and price adjustment system. Unlike many existing systems, systems and techniques of the present application use cascaded promotional processing that involves both "offline" and "online" operations to reduce extraneous and redundant computation at runtime. Because item-specific promotions are not dependent on conditions at checkout, such as the contents of the virtual shopping cart, a subset of all available promotions can be predetermined "offline" as "candidate" promotions for each product in a catalog. During checkout, a product's predetermined candidate promotions—rather than the entire set of available promotions—are evaluated against the virtual shopping cart to determine whether they are eligible for application. In this manner, the number of computational operations performed during checkout of a virtual shopping cart is significantly reduced.

The candidate promotion-product mapping may, in some implementations, be stored as metadata within the respective product data definitions. By providing a data structure that accommodates the integrated storage of promotions within the products, determining candidate promotions for a given product involves simply retrieving that products data definition with no additional on-the-fly steps. The mapping may be generated by a server under the control of the retailer, which can publish the catalog and/or mapping to brick-and-mortar retail electronic terminals and/or to a cloud platform serving as a web host for the retailer's online shopping web site.

The promotion determination platform of the present disclosure may leverage caching at various stages in order to reduce expensive memory calls. Each promotion may be associated with metadata that defines the parameters of that promotion, such as the name of the promotion, purchase conditions, and the reward associated with the promotion. A set of promotions may be stored within the application, to avoid having to access a database and wait for the response.

When a user adds an item to a virtual shopping cart, the system may initially refer to a candidate promotion-product mapping to identify one or more candidate promotions associated with that item. Because the promotion definitions are cached, the candidate promotion-product mapping may simply contain an identifier for each promotion without having to duplicate its definition, which can be accessed quickly and efficiently from the cache.

Once the candidate promotion-product mapping has been retrieved, the system may carry out promotion evaluation (described in greater detail below) to determine one or more promotions to apply to the virtual shopping cart. In some implementations—such as those in which the MVFLEX Expression Language (MVEL)—promotion evaluation involves generating an expression, compiling that expression, and executing that expression. To avoid redundant computing, the promotion evaluation expression for the item may be generated, compiled, and cached. In this manner, if the user adds another item to the virtual shopping cart, the compiled promotion evaluation expression for the first item may be executed (potentially taking into account the new item added to the cart) without having to re-compile the expression. By reducing the number of database calls and data unmarshalling, system performance is further improved.

To ensure that the cached promotion definitions are current, each promotion definition may be stored with a timestamp indicating the date and time at which that promotion definition was stored (i.e., a "last modified" variable). When a user adds an item to a virtual shopping cart and the candidate promotion-product mapping is used to identify one or more candidate promotions associated with that item, each identified candidate promotion may also be associated with a timestamp indicating the date and time at which the candidate promotion-product mapping was created. If a candidate promotion-product mapping timestamp is more recent than the cached candidate promotion definition timestamp, the system may determine that the promotion definition is not current and may retrieve the current promotion definition metadata from the database. In this manner, the cached promotion definitions are updated as needed.

The features of the promotion platform described herein collectively improve the speed, reliability, and flexibility of the determination and application of promotions in an internet-based environment where increased processing time and latency can significantly diminish the user experience.

An objective of the present application is to effect appropriate price adjustments on items added to a virtual shopping cart. Generating the predetermined candidate promotion-product mapping significantly reduces promotion evaluation during runtime. Additionally, business administrators have increased flexibility in adjusting promotional offerings in real time. The advanced promotion system is also capable of identifying potentially applicable promotions, enabling cart context-based promotional messaging to alert users of potential savings (e.g., "purchase two of item x to receive a 10% discount" or "add product y to cart and receive $25 off your total purchase").

In experimental testing, 1.4 million distinct products and 400 available active promotions were offline batch processed in approximately 5 minutes time, generating a candidate promotion-product mapping. Applying this predetermined mapping in a set of comparative tests between legacy promotion evaluation and the cascaded promotion evaluation described herein, the system was able to complete cart promotion evaluations in about 90 milliseconds in $90^{th}$ percentile of the test cases (with 2500 transactions per second (TPS) to the database)—performance that is approximately four times faster than legacy systems.

II. Example Systems

A promotion system may include computing devices, servers, cloud services (e.g., platform-as-a-service (PaaS)), local area networks, wide area networks, and/or any combination thereof. FIG. 1 illustrates an example promotion system 100, which includes a local server 110 and a cloud platform 130 communicatively coupled via a network 120. The cloud platform 130 is operable to communicate with computing devices 140 over a wide area network, such as the internet.

Broadly, the local server 110 may be operated and maintained by a retailer. The local server 110 may store a product catalog, a promotion database, and other associated information. The retailer may control the contents of the product catalog and the details of each product within the catalog to reflect the current offering of products by the retailer. The local server 110 may include batch processes and other applications for modifying the contents of the catalog, modifying the contents of the promotion database, and/or otherwise maintaining the local server 110. The term "local" as used herein with respect to the local server 110 is used for explanatory purposes, and should not be understood as limiting the physical or geographic location of the local server 110 in various implementations.

The local server 110 may be in communication with one or more external computing systems. For example, the local server 110 may communicate product catalog information to terminal systems of brick-and-mortar retail stores, allowing the local server 110 to "publish" updated product and promotion information to geographically disparate stores. The local server 110 may also communicate with the cloud platform 130 via the network 120. The network 120 may be a local area network, a wide area network (e.g., the internet), or some combination thereof.

The cloud platform 130 may be a combination of computing devices operable to provide a combination of "front end" applications (i.e., presentation layer human interfaces) and "back end" applications (i.e., data accessing and processing). The cloud platform 130 may include a web hosting service that hosts the retailer's online shopping website. The cloud platform 130 may also include back end applications for processing data associated with the online shopping website, such as calculating price discounts based on applicable promotions. The cloud platform 130 may receive product catalog and promotion data from the local server 110, among other types of information.

The computing devices 140 may include any type of computing device capable connecting to the cloud platform 130 including a desktop 141, a laptop 142, and a mobile computing device 143, among others. The computing devices 140 may each include a web browser or other application with which the retailer's online shopping website can be accessed. The computing devices may include input devices—such as mice, keyboards, and touchscreens—that permit a user to interact with the retailer's online shopping website to, for example, add products to a virtual shopping cart and "check out" to complete a purchase.

Figure 2:
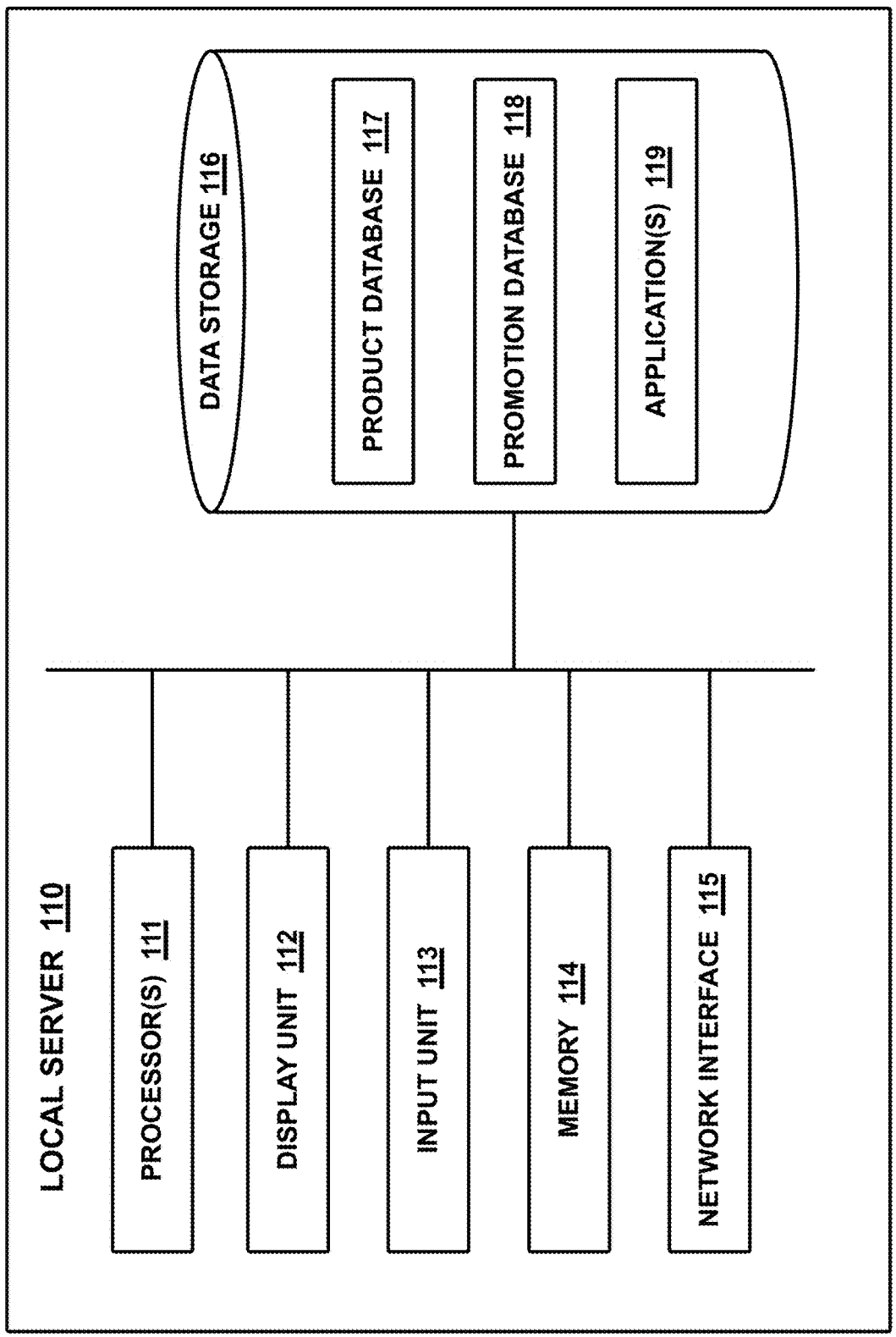
FIG. 2 is a block diagram of a local server, according to an example embodiment.

FIG. 2 is a block diagram of an example local server 110. The local server 110 includes processor(s) 111, a display unit 112, an input unit 113, a memory 114, a network interface 115, and data storage 116. Data storage 116 may store thereon a product database 117, a promotion database 118, and application(s) 119, among other information.

The processor(s) 111 may include one or more processors capable of executing instructions, which cause the local server 110 to perform various operations. The processor(s)

111 may include general-purpose central processing units (CPUs) and cache memory. The processor(s) 111 may also incorporate processing units for specific purposes, such as application-specific integrated circuits (ASICs) and field-programmable gate arrays (FPGAs). Other processors may also be included for executing operations particular to the local server 110. The processor(s) 111 may be similar to or the same as processing unit 1092, described in more detail below in relation to FIG. 10.

The display unit 112 may be any kind of device capable of displaying human-readable text and/or graphics. The display unit 112 may be similar to or the same as monitor 1030 as described in more detail below in relation to FIG. 10. Regardless of the kind of display used, the display unit 112 is an output device that can display information and user interfaces of the present application.

The input unit 113 may be any kind of human interface device (HID) that receives input from a user and translates that input into computer-understandable information. Some example input units may include keyboard 1024, mouse 1026, a touchpad, and/or a touchscreen, among other possible peripheral devices, some of which are described in more detail below with respect to FIG. 10. In some instances, the input unit 113 may refer to an on-screen keyboard or pointer device of a touchscreen. Regardless of the kind of input device used, the input unit 113 may provide an interface through which a user can interact with the local server 110.

The memory 114 may be a volatile memory, such as RAM. The memory 114 may be used as a temporary storage location used by applications and/or programs of the local server 110. Memory 114 may be similar to or the same as RAM memory 1000, described below in more detail below with respect to FIG. 10.

The network interface 115 allows the local server 110 to connect to other devices over a network. The network interface 115 may connect to a local-area network (LAN) and/or a wide-area network (WAN), such as the internet. The network interface 115 may be similar to or the same as network interface 1044 described in more detail below in relation to FIG. 10. Any combination of wired and/or wireless network interfaces and protocols may be included in network interface 115.

The data storage 116 may store thereon instructions, which are executable by the processor(s) 111 to carry out application(s) 119. The data storage 116 may also store information related to a product catalog, including the product database 117 and the promotion database 118. The data storage 116 may be similar to or the same as the hard disk 1008, removable magnetic disk 1010, and/or optical disk 1012 described in more detail below in relation to FIG. 10, among other possible storage devices.

The product database 117 may include a plurality of product data objects or entries stored within a table, database, or other computer-readable format. The product database may include entries for product data definitions the same as or similar to product 500 shown and described with respect to FIG. 5.

Likewise, the promotion database 118 may include a plurality of promotion data objects or entries stored within a table, database, or other computer-readable format. The promotion database may include entries for product data definitions the same as or similar to promotion 400 shown and described with respect to FIG. 4.

The application(s) 119 may include any combination of applications for user interfaces, database modification and maintenance, administrative interfaces, synchronization programs for publishing data (such as the product database 117 and the promotion database 118) to cloud platform 130 and/or other electronic terminal systems, and/or any other application. Moreover, the application(s) 119 may be similar to or the same as application program 1018 described in more detail below in relation to FIG. 10.

Figure 3:
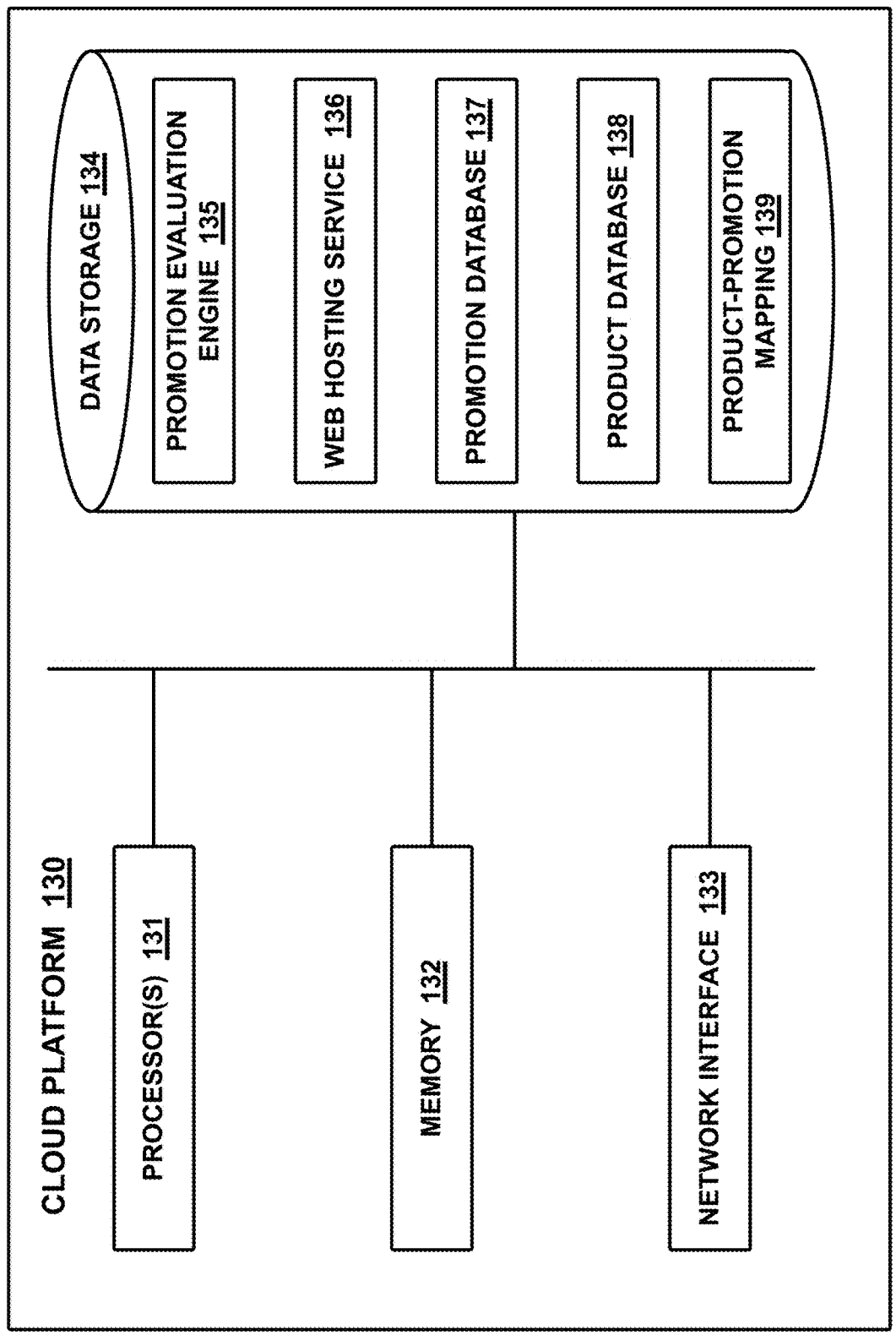
FIG. 3 is a block diagram of a cloud platform, according to an example embodiment.

FIG. 3 is a block diagram of an example cloud platform 130. The cloud platform 130 includes processor(s) 131, a memory 132, a network interface 133, and data storage 134. Data storage 134 may store thereon a promotion evaluation engine 135, a web hosting server 136, a promotion database 137, a product database 138, and a product-promotion mapping 139, among other information.

The processor(s) 131 may include one or more processors capable of executing instructions, which cause the cloud platform 130 to perform various operations. The processor(s) 131 may be similar to or the same as processing unit 1092, described in more detail below in relation to FIG. 10.

The memory 132 may be a volatile memory, such as RAM. The memory 132 may be used as a temporary storage location used by applications and/or programs of the the cloud platform 130. The memory 132 may be similar to or the same as RAM memory 1000, described below in more detail below with respect to FIG. 10

The network interface 133 allows the cloud platform 130 to connect to other devices over a network. The network interface 133 may be similar to or the same as network interface 1044 described in more detail below in relation to FIG. 10. In some instances, the network interface 133 enables the cloud platform 130 to communicate with the local server 110.

The data storage 134 may store thereon instructions, which are executable by the processor(s) 131 to execute applications or services. The data storage 134 may include instructions for executing a promotion evaluation engine. The data storage 134 may also include instructions for executing a web hosting service 136. The data storage 134 may further include databases—including the promotion database 137, the product database 138, and the product-promotion mapping 139—which may be accessed by the promotion evaluation engine 135 and/or the web hosting service 136. The data storage 116 may be similar to or the same as the hard disk 1008, removable magnetic disk 1010, and/or optical disk 1012 described in more detail below in relation to FIG. 10, among other possible storage devices.

The promotion evaluation engine 135 may be any combination of software modules, scripts, expression evaluation platforms, application program interfaces (APIs), endpoints, webhooks, and other software operable to carry out promotion evaluation as described herein. The promotion evaluation engine 135 may operate as a service, into which virtual shopping cart data can be input and processed to determine which, if any, promotions apply to the items within the virtual shopping cart. In other words, the promotion evaluation engine 135 may be operable to execute operations disclosed herein with respect to promotion evaluation.

The promotion evaluation engine 135 may employ an expression language, platform, or framework to evaluate a virtual shopping cart to determine eligible and applicable promotions. A goal of an expression language is to accommodate for a variety of rules and conditions in a way that can easily represent those rules for human understanding and modification, while also providing for simple data access during runtime. An expression language preferably applies expressions as filters, allowing the promotion evaluation engine to narrow down the list of all conditions to one or a combination that results in the greatest discount for customers.

An example expression language that may be used is the MVFLEX Expression Language (MVEL), a dynamically-typed expression language capable of dynamic data access with serializable classes. MVEL can operate both interpretively and through a pre-compilation process. MVEL is also capable of interacting directly with native Java objects. Under heavy processing load, coercion (casting an object from one type to another) overload can be mitigated by using MVEL optimizers. Expression languages other than MVEL may be used, such as Object-Graph Navigation Language (OGNL) and Spring Expression Language (SpEL), among others.

The web hosting service 136 may any combination of software modules, scripts, application program interfaces (APIs), endpoints, webhooks, and other software operable to provide an online shopping website. The web hosting service 136 may be communicatively connected to a wide area network, such as the internet, through which it can communicate with client computing devices via the Hypertext Transfer Protocol (HTTP) or similar networking protocol. The web hosting service 136 may communicate with the promotion evaluation engine 135 to provide a customer-facing website capable of performing back end cascaded promotion evaluation and described herein.

The promotion database 137 may be similar to or the same as the promotion database 118 described above with respect to FIG. 2. In some instances, the promotion database 137 may be a copy of the promotion database 118, which the cloud platform 130 receives periodically from the local server 110.

Likewise, the product database 138 may be similar to or the same as the product database 117 described above with respect to FIG. 2. In some instances, the product database 138 may be a copy of the product database 117, which the cloud platform 130 receives periodically from the local server 110.

The product-promotion mapping 139 may be any data structure in which products are associated with respective candidate promotions. As one example, the product-promotion mapping 139 is a database containing entries that identify these various product-promotion associations. As another example, the product-promotion mapping 139 is represented as copies of candidate promotions stored as metadata within associated products. In some instances, products within the product database 138 have metadata that includes candidate promotions. Various product-promotion mapping 139 implementations are described in greater detail below.

III. Example Data Definitions

Applying promotions to a user's virtual shopping cart can be a computationally expensive task. A promotion may one or more purchase conditions that must be satisfied before that promotion can be applied. Evaluating each purchase condition of all promotions available to each of the items in a user's virtual shopping cart may take a considerable amount of time, causing delay in the user's shopping experience and expending a significant amount of computing resources.

Some purchase conditions may depend on properties of a virtual shopping cart. For example, a purchase condition of "$10 off for purchases over $100" depends on the virtual shopping cart containing one hundred dollars' worth of products. Such purchase conditions—which are referred to herein as "cart-specific purchase conditions"—are evaluated "online" once the user has selected to check out a virtual shopping cart and complete a purchase.

However, other purchase conditions may depend on attributes of a product independently from the context of a virtual shopping cart. For example, a purchase condition of "10% off all refrigerators" depends on the category of the product, but may not depend on the contents of a virtual shopping cart. Such purchase conditions—which are referred to herein as "item-specific purchase conditions"—may be predetermined in an offline batch process, such that they are readily applicable while a user is shopping without additional "online" back end computation.

Thus, one way to improve the efficiency of determining applicable promotions is to carry out an offline batch process and store the predetermined product-promotion mapping for later use. The data structure described below is an example implementation in which the combination of offline and online promotion evaluation can be achieved.

A. Promotion Metadata

Figure 4:
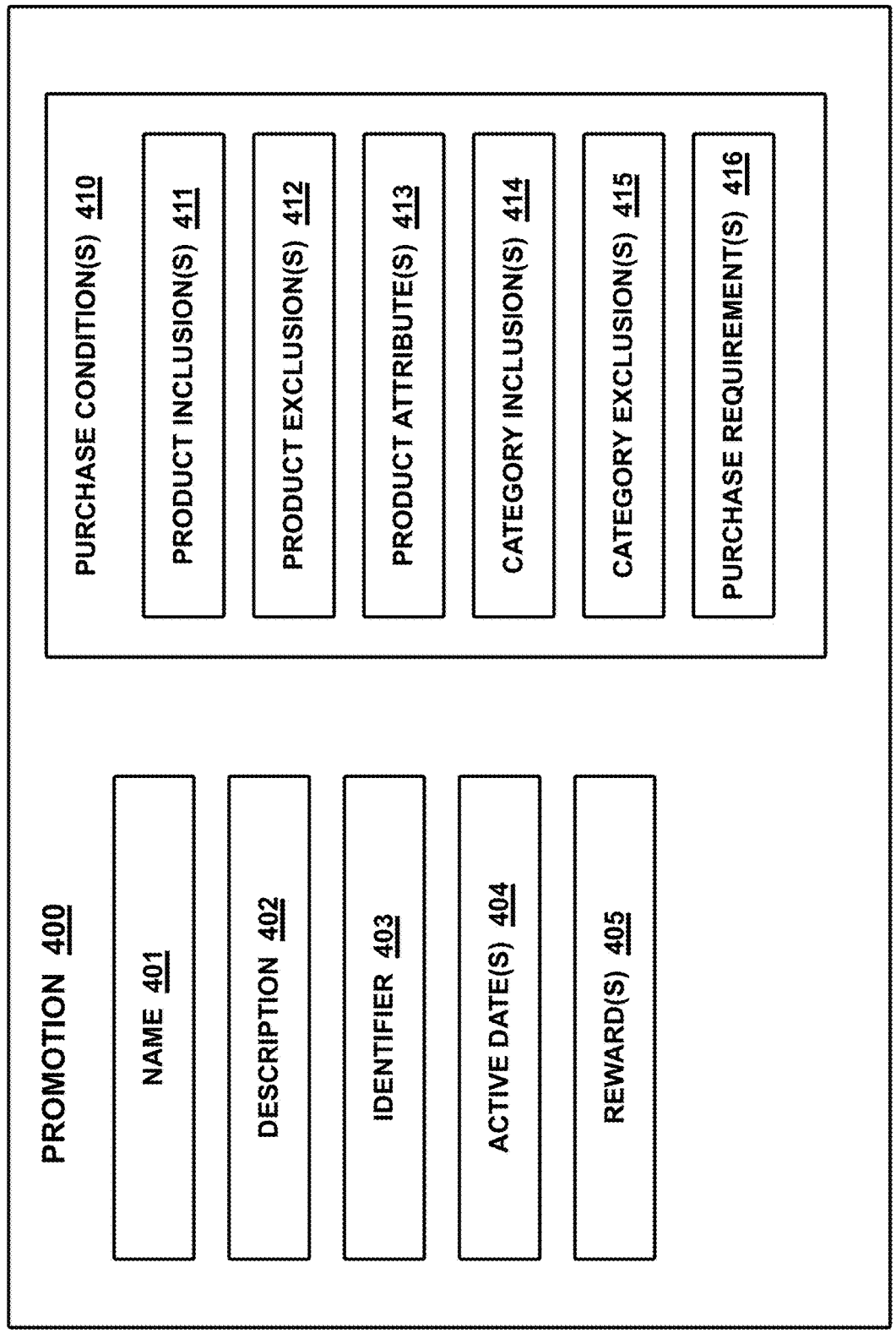
FIG. 4 is a block diagram of a promotion data definition, according to an example embodiment.

FIG. 4 is a block diagram of promotion data defining a promotion. The promotion data 400 includes a name 401, a description 402, an identifier 403, active date(s) 404, reward(s) 405, and/or purchase condition(s) 410. The purchase condition(s) 410 may include product inclusion(s) 411, product exclusion(s) 412, product attribute(s) 413, category inclusion(s) 414, category exclusion(s) 415, and/or purchase requirement(s) 416, among other kinds of purchase conditions.

The name 401 may be a brief description of the promotion for either a retailer's internal purposes, or for display on the retailer's online shopping website. Likewise, the description 402 may be a more detailed description of the promotion for either a retailer's internal purposes, or for display on the retailer's online shopping website.

The identifier 403 may be a unique identifier (e.g., a universally unique identifier (UUID), or similar) that can be used to directly refer or link to the promotion 400. In some instances, one or more identifiers may be included within identifier 403.

The active date(s) 404 may include one or more dates that collectively describe one or more date ranges during which the promotion is active. A retailer may wish to publish the promotion data 400 to a cloud platform before its associated promotion is designated to begin, such that the promotion can go live immediately upon a start date. The active date(s) 404 may allow the retailer to pre-load the promotion data 400 into its systems and execute offline batch processing jobs with respect to promotion data 400 before the associated promotion is set to become active.

B. Purchase Conditions and Rules

The purchase condition(s) 410 may include any combination of limitation, restriction, requirement, or rule that specifies whether or not the promotion 400 is applicable in a particular context. As described above, the purchase condition(s) 410 may include item-specific purchase conditions and/or cart-specific purchase conditions. For instance, product inclusion(s) 411 and product exclusion(s) 412 depend on the presence or absence of specified products in a virtual shopping cart, and are therefore cart-specific purchase conditions. In contrast, product attribute(s) 413, category inclusion(s) 414, and category exclusion(s) 415 depend on information related to the products; to the extent that these purchase conditions can be determined based on a product's stored attributes (e.g., brand, category, etc.), these are item-specific purchase conditions. Some example product attribute(s) 413 include a product's name, identifier (i.e., specifying a particular product), brand, and category, among others.

The purchase requirement(s) 416 may be any type of cart-specific condition that depends on the quantity of items in the virtual shopping cart, the price of items in the virtual shopping cart, and/or the specific contents of the virtual shopping cart. An example purchase requirement may specify a minimum or maximum quantity of a particular product (e.g., "20% off when 3 or more of x are purchased" or "buy one get one free"). Another example purchase requirement may specify a particular pairing of products necessary for the promotion 400 to be applied (e.g., "$10 off when x and y are purchased together"). Other purchase conditions may specify a minimum or maximum virtual shopping cart price subtotal (e.g., "$10 off for purchases over $100"). Other purchase requirements are also possible.

In cases where the promotion 400 includes two or more purchase conditions, each of the purchase conditions may be a requirement (i.e., all of the purchase conditions must be satisfied before promotion 400 is eligible) or an option (i.e., at least one of the purchase conditions must be satisfied before promotion 400 is eligible). Any combination of purchase conditions may be restricted according to any logical combination (e.g., "x AND (y or z)").

C. Rewards

The reward(s) 405 may specify the amount, type, and/or some rules on the application of promotion 400. Some example rewards include a specific dollar amount discount (e.g., "$10 off") or a percentage discount (e.g., "10% off"). A given reward may include additional restrictions, such as a maximum discount (e.g., "10% off up to a maximum of $100 off"). Other reward types are also possible.

The reward(s) 405 may apply a discount to an item in a user's virtual shopping cart, or to the virtual shopping cart as a whole. For example, a reward of "10% off purchases over $100" is applied to a virtual shopping cart's price subtotal, and is therefore not item-specific.

D. Product

Figure 5:
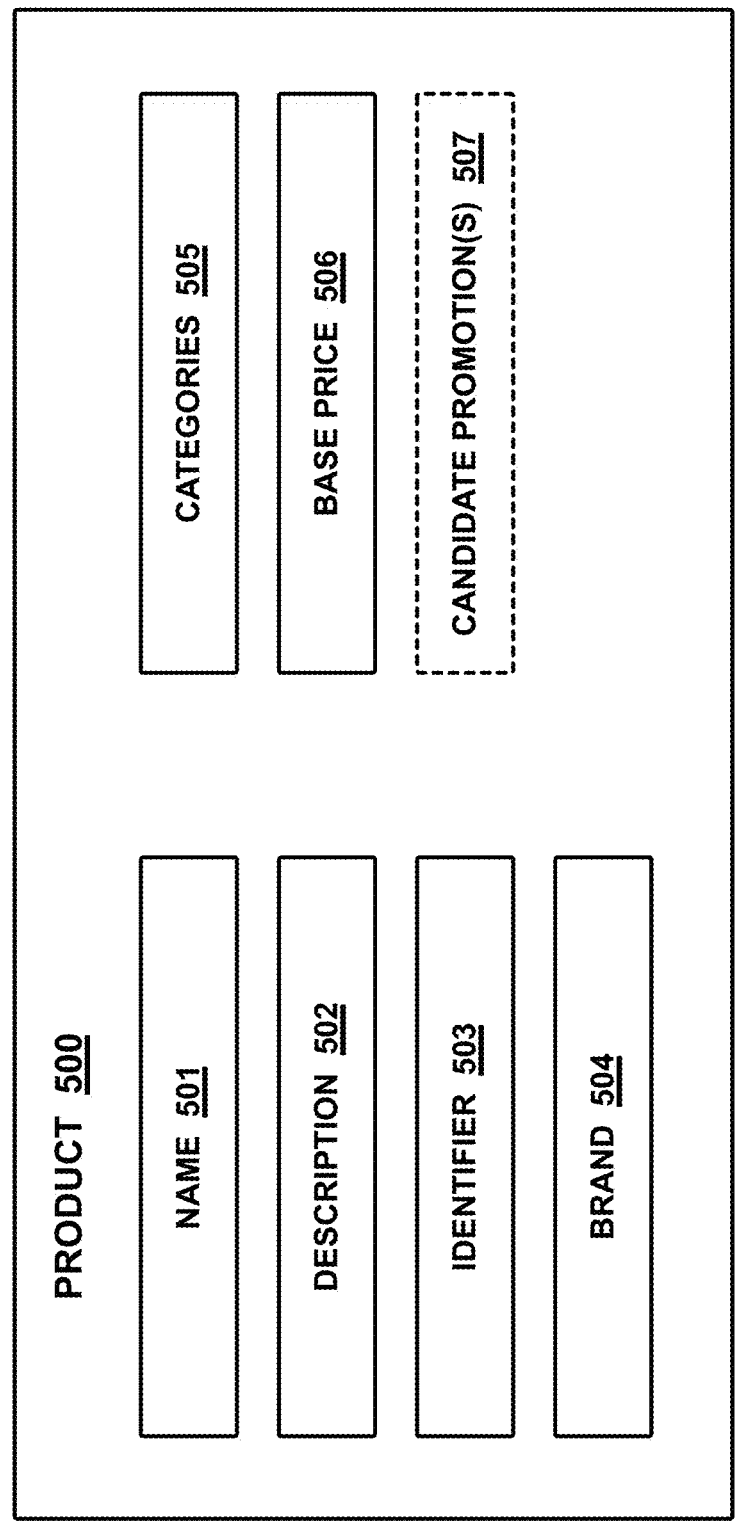
FIG. 5 is a block diagram of a product data definition, according to an example embodiment.

FIG. 5 is a block diagram of product data 500 defining a product, and may include a name 501, a description 502, an identifier 503, a brand 504, categories 505, a base price 506, and candidate promotion(s) 507. The name 501 and description 502 may include any combination of information that describes the contents and features of the product. The identifier 503 may be a unique identifier (e.g., a universally unique identifier (UUID), SKU number, or similar) that can be used to directly refer or link to the product data 500. In some instances, one or more identifiers may be included within identifier 503. The categories 505 may include one or more product categories that classify the product 500 within a product catalog. The base price 506 may indicate the price of the product without any promotions or other discounts applied thereto.

An offline batch process described herein may determine a mapping between the products and promotions within a retailer's catalog. In some cases, this product-promotion mapping may be stored in a table or database on a server, which can be accessed and queried to determine whether a given product is associated with any "candidate" promotions.

In other implementations, the product-promotion mapping may be generated and stored as a copy of the promotion (or at least a portion of the promotion definition) as metadata within the product data 500. Candidate promotion(s) 507 shown in FIG. 5 illustrates the storage of candidate promotions within the metadata of the product data 500. In these implementations, determining the candidate promotion(s) 507 associated with the product 500 is accomplished by reading out the metadata of product data 500, without having to query a separate database or perform additional computations on the fly. Directly storing candidate promotion(s) 507 within the product data 500 may allow some promotions to be applied by a web host with no additional evaluation steps, substantially reducing the amount of computing resources that would have otherwise been expended.

As described herein, a "candidate" promotion for a particular product refers to a promotion that includes an item-specific purchase condition which is satisfied by that particular product. A candidate promotion may or may not include additional purchase conditions, which may render that candidate promotion valid or invalid depending on the contents of a virtual shopping cart. For example, a candidate promotion of "10% off x brand product" with no further restrictions is valid regardless of the contents of a virtual shopping cart. As another example, a candidate promotion of "10% off x brand product when purchase exceeds $100" is only valid if the virtual shopping cart's price subtotal is greater than $100, and therefore is cart-dependent. In both of these examples, the promotion is considered a "candidate" because it may or may not be applicable to that product, depending upon additional purchase conditions.

In some embodiments, the candidate promotion(s) 507 may include a timestamp indicating the date and time at which the candidate promotion(s) 507 were associated with the product 500. If the product catalog is updated, the candidate promotion(s) 507 may become outdated or represent previously-determined and no longer applicable promotions. A promotion system may, prior to determining whether candidate promotion(s) 507 are eligible and valid, determine whether the candidate promotion(s) 507 are up-to-date based on the stored timestamp.

The data definitions described above with respect to FIGS. 4 and 5 may be stored in tables or databases on storage devices of a server or other computing device. As described herein, the combination of a plurality of products and a plurality of promotions may be collectively referred to as a "product catalog."

IV. Offline Determination Of Candidate Promotions

As described above, a promotion system may perform a combination of online and offline promotion evaluation in order to improve the efficiency and speed of on-the-fly promotion determination. This combination of operations may involve narrowing down the entire set of promotions in a catalog database to one or more valid promotions, if any, for a given product and/or virtual shopping cart.

Broadly, the offline determination of candidate promotions may involve steps that include evaluating, for each product in the catalog, whether each promotion in the catalog is a "candidate" promotion for that product. As described above, a promotion is considered a "candidate" for a given product based on that promotion including an item-specific purchase condition that is satisfied by that given product's attributes. The process of associating products with candidate promotions is generally referred to herein as the "offline processing" of the promotion system. This offline processing significantly reduces the amount of "online" computations involved in determining applicable promotions when a user checks out a virtual shopping cart.

A cascade of promotion evaluations may follow during the online determination of applicable promotions, which further narrows and validates the promotions to a particular product. First, the active date ranges of the candidate promotions may be compared against the current date, such that only "active" promotions are considered. For each of the remaining active promotions, any cart-specific purchase conditions associated with the active promotion may be evaluated against the metadata of the virtual shopping cart to determine whether the active promotion is "eligible" for application to the virtual shopping cart.

In situations where none of the active promotions are eligible, no promotion-based price discount is available for that product. If one active promotion is considered eligible for application and no other restrictions apply, that single eligible promotion may be applied to the product and/or the virtual shopping cart.

However, if two or more active promotions are considered to be "eligible" promotions, the promotion system may carry out operations to determine the "best" and/or "valid" combination of those eligible promotions, if any. For instance, the promotion system may compare every permutation of the eligible promotions to determine which combination of eligible promotions produces the largest price discount (i.e., the "best" discount, in that is results in the largest amount of money saved for the user). Then, that "best" combination may be evaluated to determine whether or not it is a valid combination. In some cases, a given promotion may prohibit combining (i.e., "stacking") that promotion with other promotions. If the "best" combination includes such a restriction, a different combination (e.g., the next largest price discount) is evaluated to determine whether or not that combination is valid. These steps may repeat until a valid combination of promotions is determined, if any.

The above-described promotion determination "cascade" thus involves determining, for a given product, which promotions (if any) from the entire set of promotions are candidate promotions; which candidate promotions are active promotions; which active promotions are eligible promotions; and, if multiple promotions are eligible, which combination of eligible promotions is a valid combination. Because the determination of candidate promotions involves evaluating each product with each promotion—where a catalog may include thousands of products and hundreds of promotions—it is a computationally expensive process that, when performed in an offline batch process, significantly reduces the online promotion evaluation.

Figure 6:
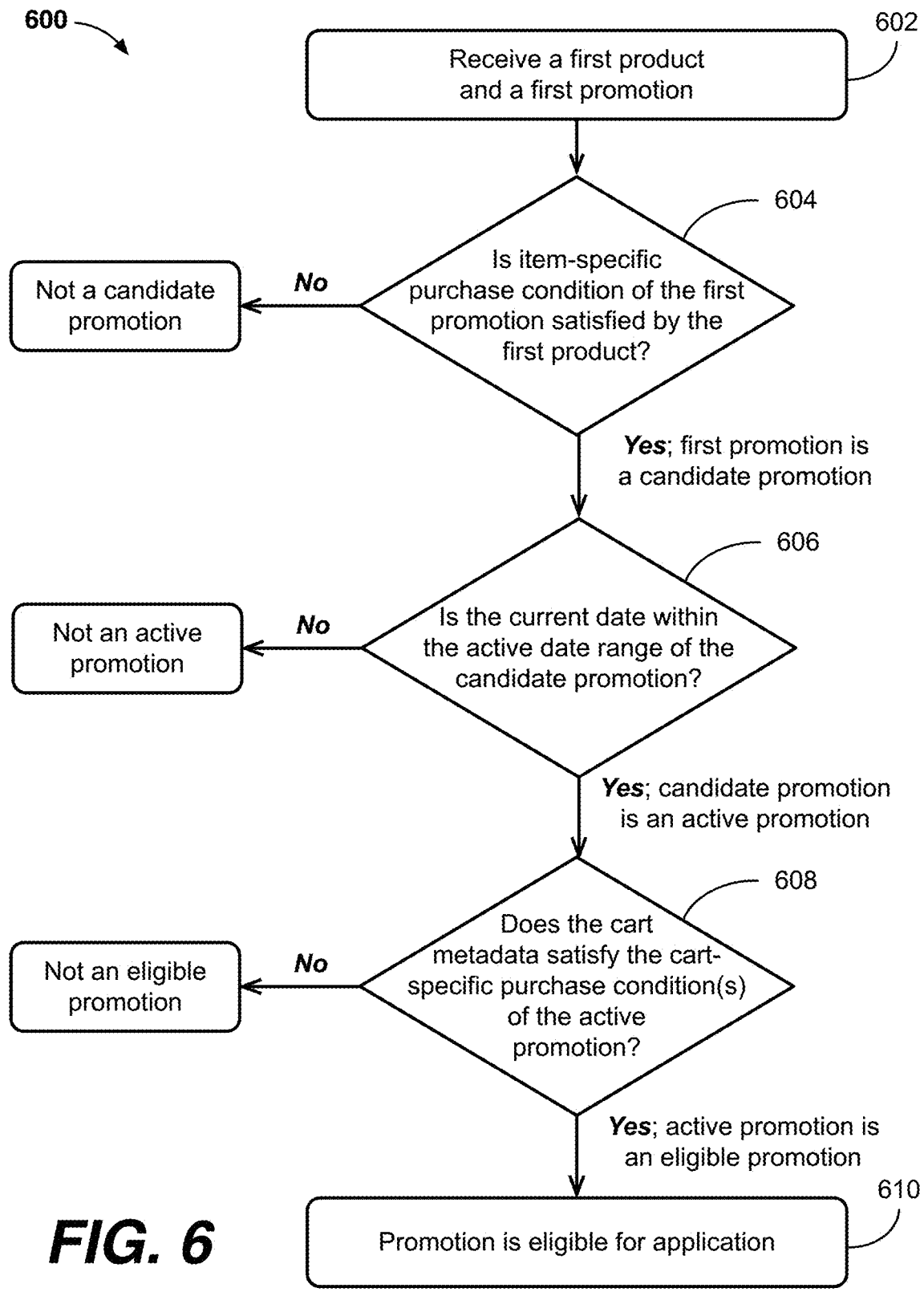
FIG. 6 is a flowchart of a promotion evaluation process, according to an example embodiment.

FIG. 6 is a flowchart of a promotion evaluation process 600, depicting a portion of the steps described above. Steps 602-610 may be performed by a computing device, server, a local server (as described above), a cloud platform (as described above), or some combination thereof. For the purposes of the following description, the steps 602-610 are described as being performed by a computing device.

At step 602, the computing device receives first product data indicative of a first product and first promotion data indicative of a first promotion. The first product data may be similar to product data 500 described above with respect to FIG. 5, and the first promotion data may be similar to the promotion data 400 described above with respect to FIG. 4. The computing device may receive the first product data and the first promotion data by retrieving them from a database stored on the computing device, or by either "pulling" them from or having them "pushed" from a separate computing device over a network.

Step 604 involves determining whether an item-specific purchase condition of the first promotion is satisfied by the metadata or attributes of the first product. If the item-specific purchase condition is not met, the first promotion is not a candidate promotion and is therefore not applicable to the first product. If the item-specific purchase condition is met by the metadata of the first product, the first promotion is a candidate promotion and the computing device proceeds to step 606. Step 604 may generally describe the step of the offline batch process for a single product and a single promotion, and may be performed at a time prior to steps 606-610.

Step 606 involves determining whether the current date is within the active date range of the candidate promotion. If the current date is not within the active date range, the candidate promotion is considered to be inactive, and is therefore not applicable to the first product. If the current date does fall within the active date range, the candidate promotion is considered to be active, and the computing device proceeds to step 608.

Step 608 involves determining whether the cart metadata satisfies the cart-specific purchase condition(s) of the active promotion. As described above, the cart-specific purchase conditions may depend on the virtual shopping cart price subtotal, the quantity of items in the virtual shopping cart, the particular combination of items in the virtual shopping cart, or other cart-specific information. If the cart-specific purchase conditions are not satisfied, the active promotion is deemed ineligible for application. If the cart-specific purchase conditions are satisfied by the properties of the virtual shopping cart, the active promotion is considered eligible for application at step 610.

Although a promotion may be considered eligible, it may or may not be validly applied to the first product or the virtual shopping cart. For example, an eligible promotion for the first product may conflict or be non-stackable with an eligible promotion for a second product in the virtual shopping cart. Additionally, the first product may be associated with two or more eligible promotions, which may or may not be validly combinable. Thus, some circumstances may cause the computing device to perform additional steps to determine whether the eligible promotion is valid before applying the price discount to the virtual shopping cart.

Figure 7:
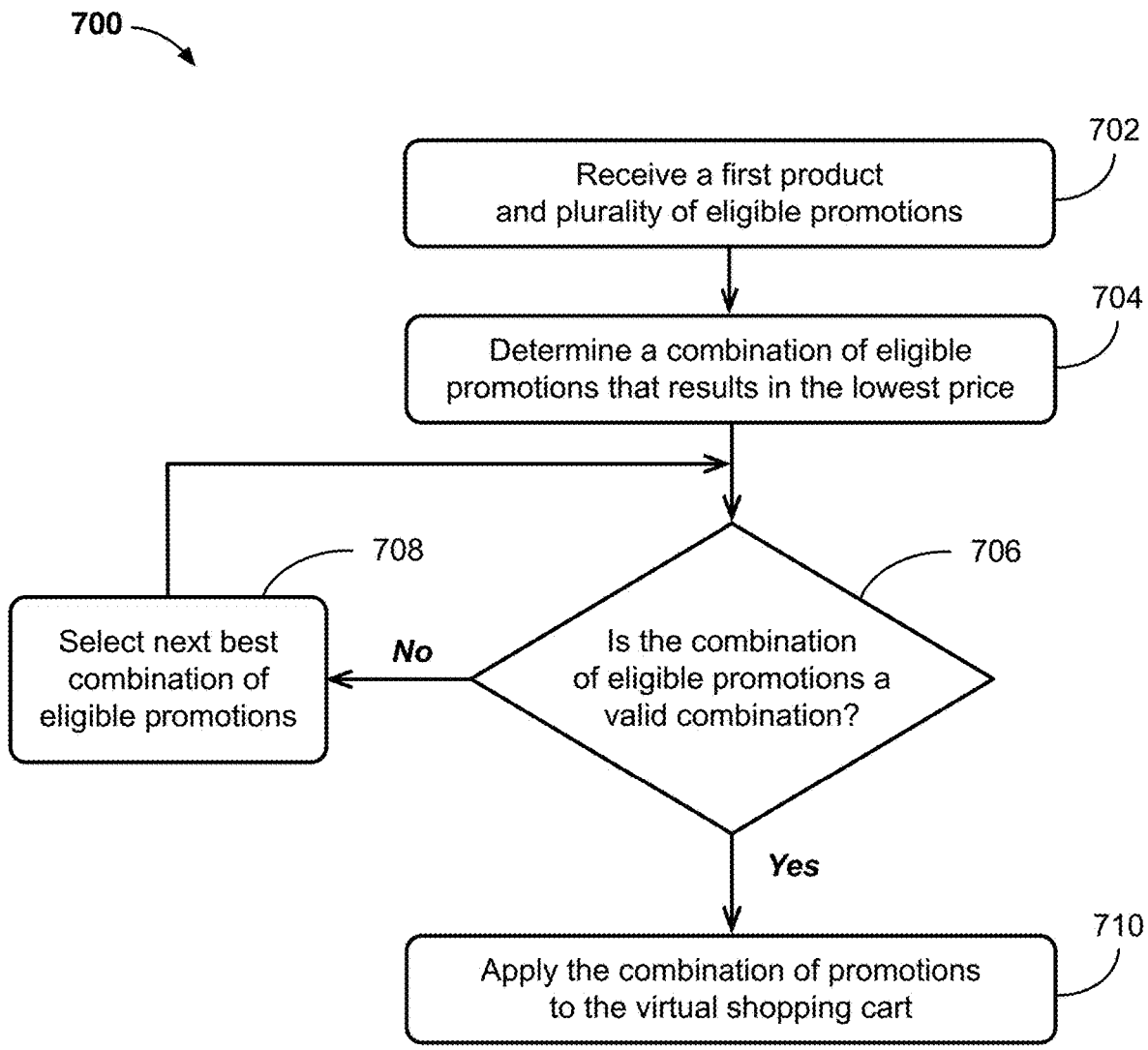
FIG. 7 is a flowchart of a promotion evaluation process, according to an example embodiment.

FIG. 7 is a flowchart of a promotion evaluation process 700. Steps 702-710 may be performed by a computing device, server, a local server (as described above), a cloud platform (as described above), or some combination thereof. For the purposes of the following description, the steps 702-710 are described as being performed by a computing device.

At step 702, the computing device receives a first product and a plurality of eligible promotions. The first product may be similar to product 500 described above with respect to FIG. 5, and the eligible promotions may be similar to the promotion 400 described above with respect to FIG. 4. The computing device may receive the first product and the eligible promotions by retrieving them from a database stored on the computing device, or may be received as a data transmission from a separate computing device over a network.

Step 704 involves determining a combination of eligible promotions that results in the lowest price. As described above, this "best" combination may be a permutation in which the combination of eligible promotions results in the largest price discount applied to the first product or the virtual shopping cart. In some implementations, step 704 involves "ranking" each permutation of eligible promotion combinations in order from largest price discount to lowest price discount, such that there is a "best" combination (i.e., the largest amount of money saved), a "next best" combination (i.e., the second largest amount of money saved), and so on.

Step 706 involves determining whether the "best" combination of eligible promotions determined at step 704 is a valid combination. A given combination may be considered invalid if at least one of the eligible promotions includes a restriction or condition that prohibits combining or stacking it other eligible promotions in that combination. If the combination is considered invalid, the "next best" combination is selected at step 708, and step 706 is performed on that combination. This process repeats until a valid combination is determined at step 706, causing the computing device to proceed to step 710.

Step 710 involves applying the combination of promotions to the first product or to the virtual shopping cart. Step 710 may include calculating the combination of promotions according to a particular order or priority (e.g., apply $ discounts first, then % discounts after), which may be specified as system-wide rules or as metadata fields within the promotions. Step 710 may also involve transmitting the determined price discount to a web server or other computing device.

V. Example Methods

Figure 8:
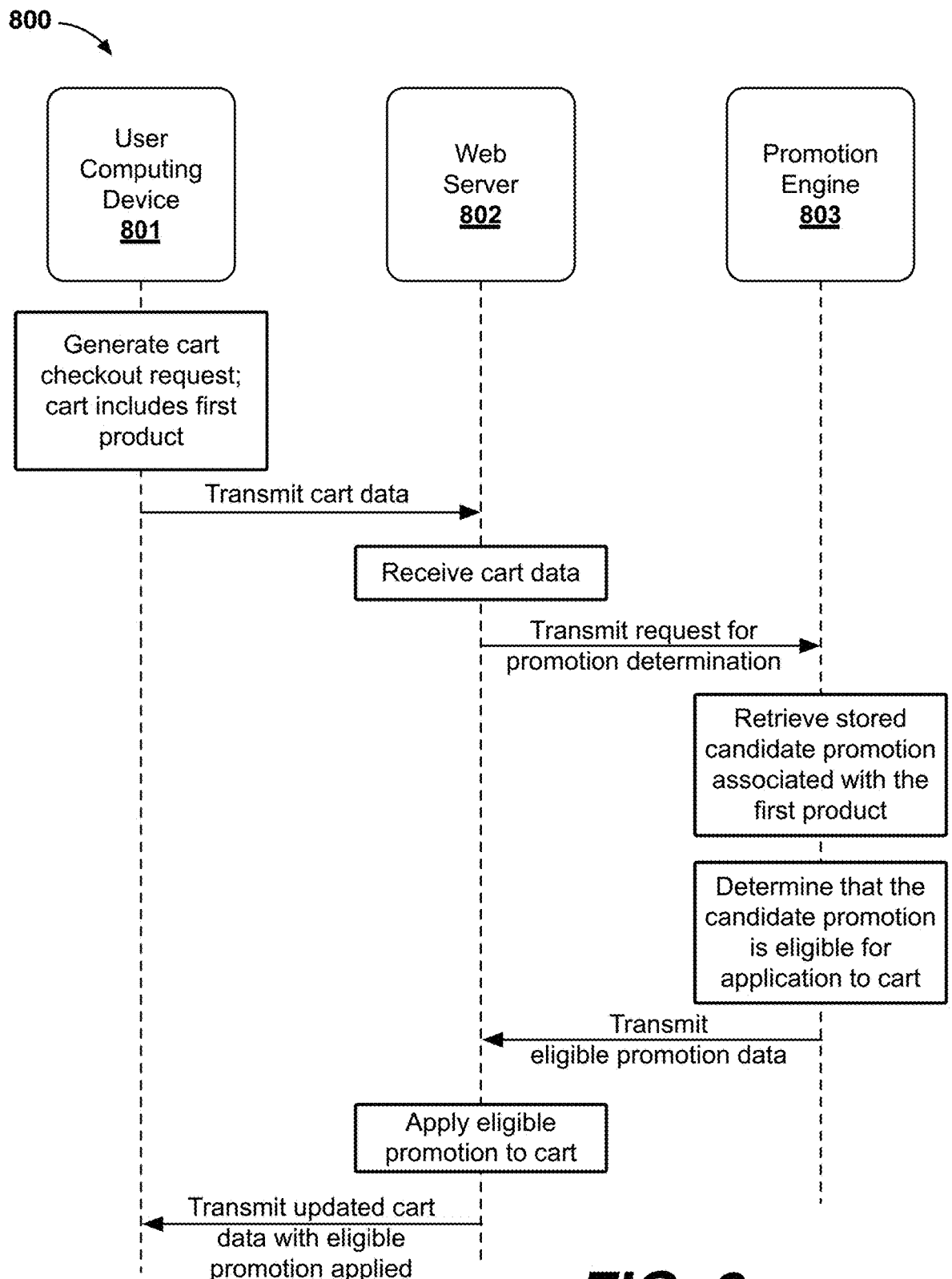
FIG. 8 is a data flow diagram illustrating a checkout process, according to an example embodiment.

Once the offline batch processes has finished generating the product-promotion mapping, the checkout process from a retailer's online shopping website may utilize the predetermined candidate promotions to reduce the amount of computer processing involved in determining and applying promotions to a virtual shopping cart. FIG. 8 illustrates an example data flow diagram of an example checkout process 800. As shown in FIG. 8, the checkout process 800 involves a user's computing device 801, a web server 802, and a promotion engine 803. The user's computing device 801 may be a personal computer, smartphone, tablet, or other consumer computing device through which a user accesses a retailer's online shopping website. The web server 802 and the promotion engine 803 conceptually represent different services provided by a cloud platform, such as cloud platform 130 described above with respect to FIGS. 1 and 3.

The data flow diagram of FIG. 8 illustrates the flow of information over time. Time increases from the top of the page to the bottom of the page, such that reading the steps from the top down indicates the order in which those steps are performed. The particular steps and their order shown in FIG. 8 are provided for explanatory purposes, and may or may not be drawn in proportion to the computing or actual time spent at each step. Further, the steps may be performed in an order different from that illustrated in FIG. 8 without departing from the scope of the present application.

First, the user's computing device 801 generates a cart checkout request, where the cart includes a first product. The cart checkout request may be generated upon a user clicking on or pressing a virtual "checkout" cart button to initiate a checkout process for the user's virtual cart on the retailer's online shopping website. Any cart data local to the user's computing device 801 (e.g., cached or non-submitted client-side data) may then be transmitted to the web server 802.

Upon receiving cart data, the web server 802 proceeds to transmit a request for promotion determination to the back end promotion engine 803. The promotion engine 803 may be, for example, an application program interface (API) endpoint, webhook, callback, or other callable method or service that evaluates a virtual shopping cart to determine and apply eligible and valid promotions. The transmitted request may be a data package (e.g., JavaScript Object Notation (JSON) or the like) that includes virtual cart metadata, information about the customer, a payment method, and/or other information related to the checkout.

Upon receiving the request for promotion determination, the promotion engine 803 retrieves the stored candidate promotions associated with the first product in the virtual shopping cart. Then, the promotion engine 803 determines that the candidate promotion is eligible to be applied to the first product or the virtual shopping cart, using techniques disclosed in the present application. The eligible promotion data is then transmitted back to the web server 802. In some implementations, the response sent by the promotion engine 803 to the web server 802 may be the transmitted request data packet with appended promotion information, such that the first item data object in the response includes metadata specifying the eligible promotion and the price discount to be applied.

After applying the eligible promotion, the web server 802 proceeds to transmit the updated cart data with the eligible promotion applied back to the user's computing device 801. The user's computing device 801, after receiving the updated cart data, may display the updated price and other information related to the applied promotion in a virtual checkout webpage.

Figure 9:
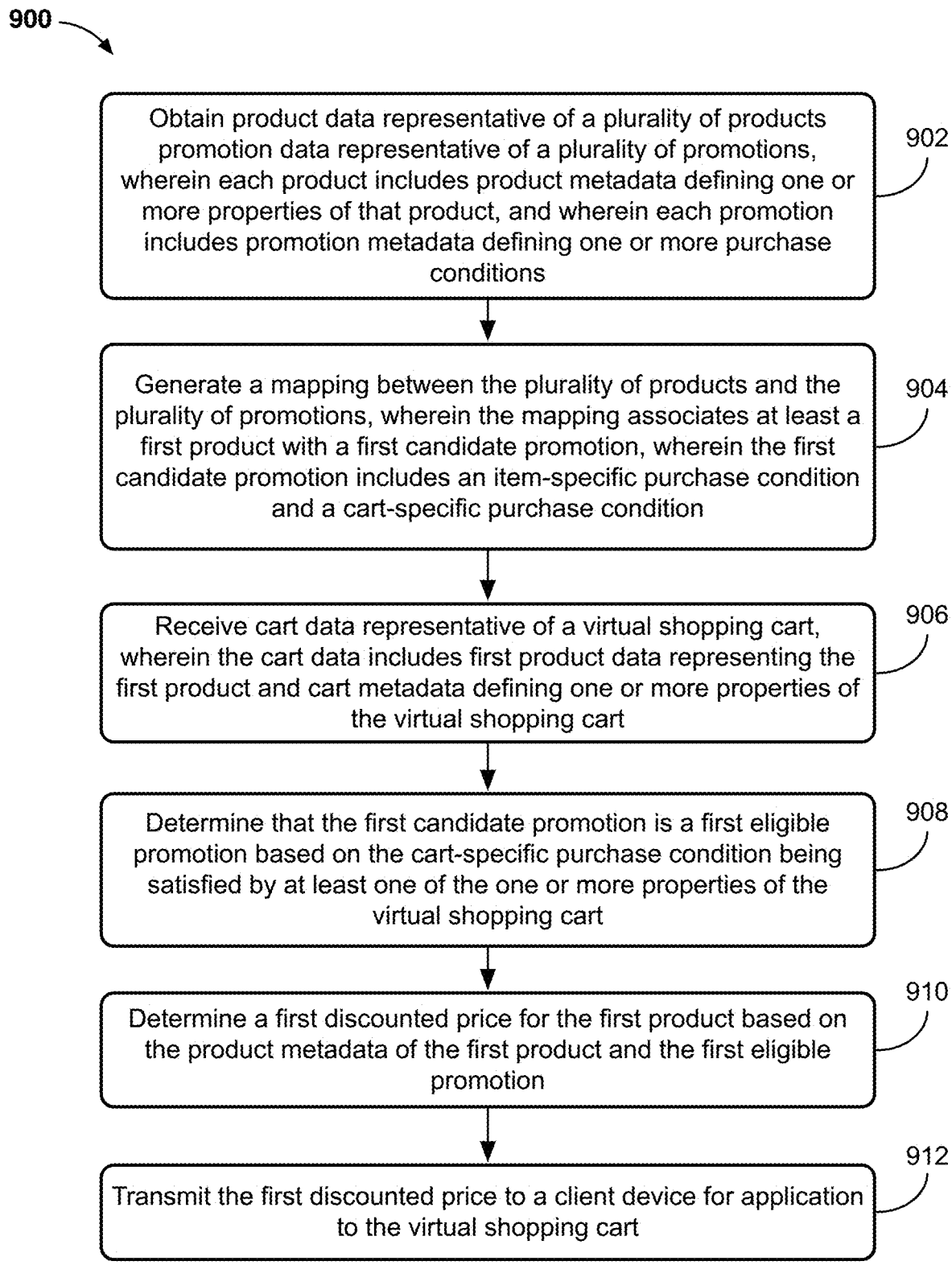
FIG. 9 is a flowchart of a promotion application procedure, according to an example embodiment.

FIG. 9 is a flowchart of operations 900 for a promotion application procedure of the present application. Operations 900 shown in FIG. 9 present an implementation that can be used by computing devices, servers, or cloud platforms. Operations 900 may include one or more actions as illustrated by blocks 902-912. Although the blocks are illustrated in sequential order, these blocks may also be performed in parallel, and/or in a different order than those described herein. Also, the various blocks may be combined into fewer blocks, divided into additional blocks, and/or removed based upon the directed implementation.

In addition, the operations 900 and other operations disclosed herein show functionality of one possible implementation. In this regard, each block may represent a module, a segment, or a portion of program code, which includes one or more instructions executable by a processor or computing device for implementing specific logical operations or steps. The program code may be stored on any type of computer-readable medium, for example, such as a storage device included in a disk or hard drive. The computer-readable medium may include a non-transitory computer-readable medium, for example, such as computer-readable media that stores data for short periods of time like register memory, processor cache and/or random access memory (RAM). The computer-readable medium may also include non-transitory media, such as secondary or persistent long-term storage, like read-only memory (ROM), optical or magnetic disks, and compact-disc read-only memory (CD-ROM), for example. The computer-readable media may be considered a computer-readable storage medium, for example, or a tangible storage device.

In addition, one or more blocks in FIG. 9 may represent circuitry that is wired to perform the specific logical operations.

Step 902 involves obtaining product data representative of a plurality of products and promotion data representative of a plurality of promotions. Each product includes product metadata defining one or more properties of that product. Each promotion includes promotion metadata defining one or more purchase conditions.

The catalog data may be obtained, for example, by a cloud platform from a local server. As one example, the local server may publish the catalog data to the cloud platform, which may store a local copy of that catalog data for later processing.

Step 904 involves generating a mapping between the plurality of products and the plurality of promotions. The mapping associates at least a first product with a first candidate promotion. The first candidate promotion includes an item-specific purchase condition and a cart-specific purchase condition. A given promotion is a candidate promotion for a given product if at least one of the purchase conditions of the given promotion is an item-specific purchase condition that is satisfied by at least one of the one or more properties of the product metadata of the given product.

As described above, the mapping may be a copy of the promotion data stored within the metadata of the first product. In other instances, the mapping may be an association, such as a pointer or identification reference, within a database. Regardless of particular implementation, step 904 generally involves determining the candidate promotion-product mapping and storing that association.

As described above, an item-specific purchase condition is a purchase condition that depends on attributes of a product without dependence on cart-specific information, while cart-specific purchase condition depends on cart-specific information.

Step 906 involves receiving cart data representative of a virtual shopping cart. The cart data includes first product data representing the first product and cart metadata defining one or more properties of the virtual shopping cart. The cart data may be received from a web host or web server, and be provided to back end computing resources of a cloud platform, for example. The cart data may include data representative of the contents of the cart and information about the user associated with the virtual shopping cart, among other information.

Step 908 involves determining that the first candidate promotion is a first eligible promotion based on the cart-specific purchase condition being satisfied by at least one of the one or more properties of the virtual shopping cart. The operations involves in evaluating the first candidate promotion against a virtual shopping cart to determine whether it is an eligible promotion is described above in more detail.

Step 910 involves determining a first discounted price for the first product based on the product metadata of the first product and the first eligible promotion. The discounted price may be determined based on a reward associated with the first eligible promotion and a base price indicated in the product metadata of the first product.

Step 912 involves transmitting the first discounted price to a client device for application to the virtual shopping cart. In some implementations, step 912 involves a back end promotion engine providing the data to a web host, web server, or other computing device that causes the virtual shopping cart to reflect the applied eligible promotion.

VI. Example Computing System Environment

Figure 10:
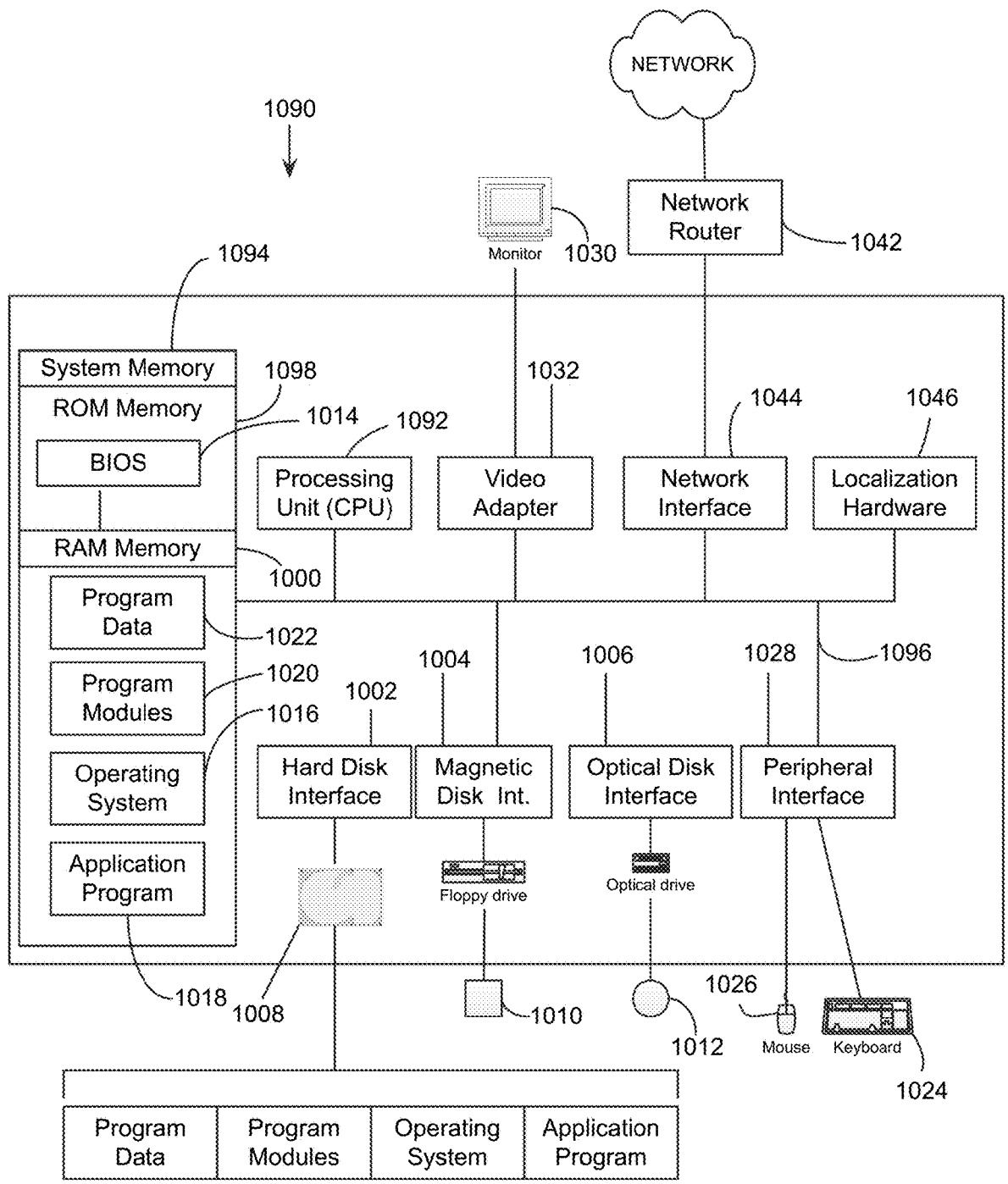
FIG. 10 is a block diagram of a computer-readable medium, according to an example embodiment.

FIG. 10 is a diagrammatic view of an illustrative computing system that includes a general purpose computing system environment 1090, such as a desktop computer, laptop, smartphone, tablet, or any other such device having the ability to execute instructions, such as those stored within a non-transient, computer-readable medium. Furthermore, while described and illustrated in the context of a single computing system 1090, those skilled in the art will also appreciate that the various tasks described hereinafter may be practiced in a distributed environment having multiple computing systems 1090 linked via a local or wide-area network in which the executable instructions may be associated with and/or executed by one or more of multiple computing systems 1090.

In its most basic configuration, computing system environment 1090 typically includes at least one processing unit 1092 and at least one memory 1094, which may be linked via a bus 1096. Depending on the exact configuration and type of computing system environment, memory 1094 may be volatile (such as RAM 1000), non-volatile (such as ROM 1098, flash memory, etc.) or some combination of the two. Computing system environment 1090 may have additional features and/or functionality. For example, computing system environment 1090 may also include additional storage (removable and/or non-removable) including, but not limited to, magnetic or optical disks, tape drives and/or flash drives. Such additional memory devices may be made accessible to the computing system environment 1090 by means of, for example, a hard disk drive interface 1002, a magnetic disk drive interface 1004, and/or an optical disk drive interface 1006. As will be understood, these devices, which would be linked to the system bus 1096, respectively, allow for reading from and writing to a hard disk 1008, reading from or writing to a removable magnetic disk 1010, and/or for reading from or writing to a removable optical disk 1012, such as a CD/DVD ROM or other optical media. The drive interfaces and their associated computer-readable media allow for the nonvolatile storage of computer readable instructions, data structures, program modules and other data for the computing system environment 1090. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 1090.

A number of program modules may be stored in one or more of the memory/media devices. For example, a basic input/output system (BIOS) 1014, containing the basic routines that help to transfer information between elements within the computing system environment 1090, such as during start-up, may be stored in ROM 1098. Similarly, RAM 1000, hard drive 1008, and/or peripheral memory devices may be used to store computer executable instructions comprising an operating system 1016, one or more applications programs 1018 (such as the request management processes disclosed herein), other program modules 1020, and/or program data 1022. Still further, computer-executable instructions may be downloaded to the computing environment 1090 as needed, for example, via a network connection.

An end-user, e.g., a customer, retail associate, and the like, may enter commands and information into the computing system environment 1090 through input devices such as a keyboard 1024 and/or a pointing device 1026. While not illustrated, other input devices may include a microphone, a joystick, a game pad, a scanner, etc. These and other input devices would typically be connected to the processing unit 1092 by means of a peripheral interface 1028 which, in turn, would be coupled to bus 1096. Input devices may be directly or indirectly connected to processor 1092 via interfaces such as, for example, a parallel port, game port, firewire, or a universal serial bus (USB). To view information from the computing system environment 1090, a monitor 1030 or other type of display device may also be connected to bus 1096 via an interface, such as via video adapter 1032. In addition to the monitor 1030, the computing system environment 1090 may also include other peripheral output devices, not shown, such as speakers and printers.

The computing system environment 1090 may also utilize logical connections to one or more computing system environments. Communications between the computing system environment 1090 and the remote computing system environment may be exchanged via a further processing device, such a network router 1042, that is responsible for network routing. Communications with the network router 1042 may be performed via a network interface component 1044. Thus, within such a networked environment, e.g., the Internet, World Wide Web, LAN, or other like type of wired or wireless network, it will be appreciated that program modules depicted relative to the computing system environment 1090, or portions thereof, may be stored in the memory storage device(s) of the computing system environment 1090.

The computing system environment 1090 may also include localization hardware 1046 for determining a location of the computing system environment 1090. In embodiments, the localization hardware 1046 may include, for example only, a GPS antenna, an RFID chip or reader, a WiFi antenna, or other computing hardware that may be used to capture or transmit signals that may be used to determine the location of the computing system environment 1090.

The computing environment 1090, or portions thereof, may comprise the promotion system 100 of FIG. 1, one or more of the components of the local server 110 of FIG. 2, and/or one or more of the components of the cloud platform 130 of FIG. 3.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various embodiments of the present invention.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

VII. Example Promotional Messaging

In additional to promotional evaluation, systems of the present disclosure may also provide promotional messaging to inform customers of available or potentially applicable promotions. Such promotion messaging may be presented graphically to users as overlays, popups, or other visual indicators that informs users of potential savings.

As one example, promotional information may be displayed to users on a product information page (PIP). An example illustration of promotional messaging on a PIP webpage 1100 is shown in FIG. 11. From a backend perspective, the promotion system may initially obtain the candidate promotions for the item "Widget" shown in FIG. 11, which includes a promotion of "$20 off with a purchase of 3 Widgets." In this example, the existence of a candidate promotion causes the webpage 1100 to include a message stating "Buy more and save!" that, when clicked or a mouse is hovered over it, causes window 1101 to appear. Window 1101 includes details about the candidate promotion, such as the promotion duration 1102 (e.g., the starting date and ending date of the promotion), message 1103 indicating purchase conditions and the reward (Buy 3 Widgets and receive $20 off your order), and restriction 1104 (a limit of 6 Widgets per customer).

The details provided in window 1101 may be automatically generated based on promotion definitions and/or the candidate promotion-product mapping of the promotion system. Although a specific arrangement is shown in FIG. 11, other details and arrangements are also possible.

In some implementations, the promotion definitions may be cached within the application. As a result, once the candidate promotion-product mapping has been accessed to identify one or more candidate promotions for the Widget item, generating the promotional messaging on webpage 1100 may occur quickly without requiring additional database accessing or wait times. In this manner, promotion definition caching may further increase the speed of the promotion platform.

VIII. Conclusion

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

We claim:

1. A system for applying promotional price adjustments to a virtual shopping cart comprising:
   a first server configured to maintain a catalog database that includes a plurality of products and a plurality of promotions, wherein data representative of each product includes product metadata defining one or more properties of that product, and wherein each promotion includes promotion metadata defining one or more purchase conditions; and
   a second server configured to provide an online shopping website over a wide area network, wherein the second server is communicatively coupled with the first server via the wide area network,
   wherein the first server is further configured to:
      generate a first mapping between the plurality of products and the plurality of promotions at a first time, wherein the first mapping associates at least a first product with a first candidate promotion based on at least one of the one or more properties of the first product satisfying an item-specific purchase condition of the first candidate promotion, and wherein the first mapping includes a first timestamp representative of the first time;
      transmit, via the wide area network, the first mapping to the second server;
      receive a request to modify the promotion metadata of the first candidate promotion;
      generate, at a second time that occurs after the first time, a second mapping between the first product with the first candidate promotion based on the modified promotion metadata;
      generate a second timestamp representative of the second time; and
      transmit, to the second server, a message indicating that the second mapping is available, wherein the message includes the second timestamp, and
   wherein the second server is further configured to:
      store, on a storage device of the second server, the generated first mapping received from the first server;
      receive, from a client device over the wide area network, a checkout request associated with a virtual shopping cart;
      obtain cart data representative of the virtual shopping cart, wherein the cart data includes first product data representing the first product and cart metadata defining one or more properties of the virtual shopping cart;
      determine that the first mapping is invalid based on the second timestamp of the message occurring after the first timestamp;
      retrieve, from the first server, the second mapping;
      determine, based on the second mapping, that the first candidate promotion is a first eligible promotion based on the cart-specific purchase condition being satisfied by at least one of the one or more properties of the virtual shopping cart;
      determine a first discounted price for the first product based on the product metadata of the first product and the first eligible promotion; and
      transmit the first discounted price to the client device for displaying the first eligible promotion being applied to the virtual shopping cart.

2. The system of claim 1, wherein the client device is a first client device, wherein the cart data is first cart data, wherein the virtual shopping cart is a first virtual shopping cart, wherein the checkout request is a first checkout request received at a first time, and
   wherein the second server is further configured to:
      upon receiving the mapping from the first server, storing the mapping on the storage device of the second server;
      receive, from a second client device over the wide area network, a second checkout request associated with a second virtual shopping cart, wherein the second checkout request is received at a third time that occurs after the first time and before the second time;
      obtain second cart data representative of the second virtual shopping cart, wherein the second cart data includes the first product and cart metadata defining one or more properties of the second virtual shopping cart;
      determining that the first mapping stored on the storage device of the second server is valid;
      based on the determination that the first mapping stored on the storage device of the second server is valid, determine that the first candidate promotion of the first mapping is the first eligible promotion based on the cart-specific purchase condition being satisfied by at least one of the one or more properties of the virtual shopping cart;
      determine a second discounted price for the first product based on the product metadata of the first product and the first eligible promotion; and
      transmit the second discounted price to the second client device for displaying the first eligible promotion being applied to the virtual shopping cart.

3. The system of claim 1, wherein generating the mapping comprises:
   for each product of a plurality of products:
      determining, for each promotion of the plurality of promotions, whether the promotion is a candidate promotion for the product based on the promotion metadata including an item-specific purchase condition that is satisfied by at least one of the one or more properties of the product; and
      upon determining that at least one promotion of the plurality of promotions is a candidate promotion, storing, in a storage device of the first server, data indicative of the promotion metadata of the at least one candidate promotion within the product metadata of the product.

4. In a server, a method for applying promotional price adjustments to a virtual shopping cart comprising:
  obtaining, from a storage device, product data representative of a plurality of products, wherein the product data for each product includes product metadata defining one or more properties of that product;
  obtaining, from the storage device, promotion data representative of a plurality of promotions, wherein each promotion includes promotion metadata defining one or more purchase conditions;
  generating, by the server, a first mapping between the plurality of products and the plurality of promotions at a first time, wherein the first mapping associates at least a first product with a first candidate promotion, wherein:
    the first candidate promotion includes an item-specific purchase condition and a cart-specific purchase condition,
    a given promotion is a candidate promotion for a given product if at least one of the purchase conditions of the given promotion is an item-specific purchase condition that is satisfied by at least one of the one or more properties of the product metadata of the given product, and
    the first mapping between the plurality of products with the plurality of promotions includes a first timestamp representative of the first time;
  storing the first mapping in the storage device;
  receiving a request to modify the promotion metadata of the first candidate promotion;
  generating, at a second time that occurs after the first time, a second mapping between the plurality of products and the plurality of promotions based on the modified promotion metadata, wherein the second mapping includes a second timestamp representative of the second time;
  storing the second mapping in the storage device;
  receiving, from a client device, cart data representative of the virtual shopping cart, wherein the cart data includes first product data representing the first product and cart metadata defining one or more properties of the virtual shopping cart;
  determining, by the server, that the first mapping is invalid based on the second timestamp occurring after the first timestamp;
  determining, by the server based on the second mapping, that the first candidate promotion is a first eligible promotion based on the cart-specific purchase condition being satisfied by at least one of the one or more properties of the virtual shopping cart;
  determining, by the server, a first discounted price for the first product based on the product metadata of the first product and the first eligible promotion; and
  transmitting the first discounted price to the client device for application to the virtual shopping cart.

5. The method of claim 4, wherein generating the mapping comprises:
  for each product of the plurality of products:
    determining, for each promotion of the plurality of promotions, whether the promotion is a candidate promotion for the product based on the promotion metadata including an item-specific purchase condition that is satisfied by at least one of the one or more properties of the product; and
    upon determining that at least one promotion of the plurality of promotions is a candidate promotion, storing, in the storage device, data indicative of the promotion metadata of the at least one candidate promotion within the product metadata of the product.

6. The method of claim 4, wherein the one or more properties of the first product includes a first product identifier, wherein the item-specific purchase condition of the first candidate promotion is a particular identifier requirement, and wherein the particular identifier requirement is satisfied by the first product identifier.

7. The method of claim 4, wherein the one or more properties of the first product includes a first product brand, wherein the item-specific purchase condition of the first candidate promotion is a brand requirement, and wherein the brand requirement is satisfied by the first product brand.

8. The method of claim 4, wherein the one or more properties of the first product includes a first product category, wherein the item-specific purchase condition of the first candidate promotion is a category requirement, and wherein the category requirement is satisfied by the first product category.

9. The method of claim 4, wherein the one or more properties of the cart metadata includes a cart price subtotal, wherein the cart-specific purchase condition is a maximum cart price subtotal threshold, and wherein the cart price subtotal is above the minimum cart price subtotal threshold.

10. The method of claim 4, wherein the one or more properties of the cart metadata includes a cart price subtotal, wherein the cart-specific purchase condition is a minimum cart price subtotal threshold, and wherein the cart price subtotal is below the minimum cart price subtotal threshold.

11. The method of claim 4, wherein the one or more properties of the cart metadata includes a quantity of the first product, wherein the cart-specific purchase condition is a minimum first product quantity threshold, and wherein the quantity of the first product is greater than or equal to the minimum first product quantity threshold.

12. The method of claim 4, wherein the one or more properties of the cart metadata includes a quantity of the first product, wherein the cart-specific purchase condition is a maximum first product quantity threshold, and wherein the quantity of the first product is less than or equal to the maximum first product quantity threshold.

13. The method of claim 4, wherein the promotion metadata or the modified promotion metadata of the candidate promotion further includes a starting date and an ending date that collectively define a period of time during which the candidate promotion is active, and wherein the method further comprises:
  determining, by the server, a current date; and
  prior to the determination that the first candidate promotion is the first eligible promotion, determining, by the server, that the first candidate promotion is a first active promotion based on the current date being between the starting date and the ending date.

14. The method of claim 4, further comprising:
  upon receiving the cart data, retrieving, from the storage device, the second mapping at a third time, wherein the third time occurs after the second time.

15. The method of claim 4, wherein the second mapping further associates a second product with a second candidate promotion, wherein the second candidate promotion includes a cart-specific purchase condition that is eligible based on the virtual shopping cart including the first product, wherein the cart data further includes the second product, and wherein the method further comprises:

determining, by the server, that the second candidate promotion is a second eligible promotion based on the cart data including the first product; and determining, by the server, a second discounted price for at least the second product based on the product metadata of the second product and the second eligible promotion; and transmitting the second discounted price to the client device for application to the virtual shopping cart.

16. In a server, a method for applying promotional price adjustments to a virtual shopping cart comprising:

obtaining, from a storage device, product data representative of a plurality of products, wherein the product data for each product includes product metadata defining one or more properties of that product;

obtaining, from the storage device, promotion data representative of a plurality of promotions, wherein each promotion includes promotion metadata defining one or more purchase conditions;

generating, by the server, a first mapping between the plurality of products and the plurality of promotions at a first time, wherein the first mapping associates at least a first product with one or more candidate promotions, wherein:

a given promotion is a candidate promotion for a given product if at least one of the purchase conditions of the given promotion is an item-specific purchase condition that is satisfied by at least one of the one or more properties of the product metadata of the given product and the first mapping between the plurality of products with the plurality of promotions includes a first timestamp representative of the first time;

storing the first mapping on the storage device;

receiving a request to modify the promotion metadata of the one or more candidate promotions;

generating, at a second time that occurs after the first time, a second mapping between the plurality of products and the plurality of promotions based on the modified promotion metadata, wherein the second mapping includes a second timestamp representative of the second time;

storing the second mapping in the storage device;

receiving, from a client device, cart data representative of the virtual shopping cart, wherein the cart data includes first product data representing the first product and cart metadata defining one or more properties of the virtual shopping cart;

determining, by the server, that the first mapping is invalid based on the second timestamp occurring after the first timestamp;

determining, for each of the one or more candidate promotions associated with the first product based on the second mapping, whether that candidate promotion is an eligible promotion for application to the virtual shopping cart based on at least one cart-specific purchase condition associated with that candidate promotion being satisfied by at least one of the one or more properties of the virtual shopping cart;

upon determining that at least one of the one or more candidate promotions is an eligible promotion, determining, by the server, a discounted price for the first product based on the product metadata of the first product and the at least one eligible promotion; and transmitting the discounted price to the client device for application to the virtual shopping cart.

17. The method of claim 16, wherein the at least one eligible promotion includes a first eligible promotion and a second eligible promotion, and wherein determining the discounted price comprises:

determining, by the server, that the first eligible promotion is prohibited from being combined with the second eligible promotion;

determining, by the server, a first potential discounted price based on the product metadata of the first product and the first eligible promotion;

determining, by the server, a second potential discounted price based on the product metadata of the first product and the second eligible promotion; and determining, by the server, the discounted price as a lesser of the first potential discounted price and the second potential discounted price.

18. The computer-implemented method of claim 16, wherein the at least one eligible promotion includes a first eligible promotion and a second eligible promotion, and wherein determining the discounted price comprises:

determining, by the server, a first potential discounted price based on the product metadata of the first product and the first eligible promotion;

determining, by the server, a second potential discounted price based on the product metadata of the first product and the second eligible promotion; and determining, by the server, the discounted price as a combination of the first potential discounted price and the second potential discounted price.

* * * * *